United States Patent [19]

Lyon

[11] Patent Number: 5,453,122
[45] Date of Patent: Sep. 26, 1995

[54] INK COMPOSITION

[75] Inventor: Peter J. Lyon, Leicestershire, England

[73] Assignee: Willett International Limited, United Kingdom

[21] Appl. No.: 320,335

[22] Filed: Oct. 11, 1994

Related U.S. Application Data

[63] Continuation of Ser. No. 104,051, Aug. 13, 1993, abandoned.

[30] Foreign Application Priority Data

Feb. 16, 1991 [GB] United Kingdom .................. 9103327

[51] Int. Cl.6 ............................ C09D 11/02; C09D 11/08; C09D 11/14
[52] U.S. Cl. .................. 106/20 R; 106/22 R; 106/26 R; 106/30 R
[58] Field of Search ............................. 106/22 R, 26 R, 106/30 R, 20 R

[56] References Cited

U.S. PATENT DOCUMENTS

| | | | |
|---|---|---|---|
| 4,070,322 | 1/1978 | Hwang et al. | 106/22 C |
| 4,106,027 | 8/1978 | Hoffmann et al. | 106/22 B |
| 4,352,901 | 10/1982 | Maxwell et al. | 106/20 D |
| 4,389,503 | 6/1983 | Maxwell et al. | 106/22 F |
| 4,849,770 | 7/1989 | Koike et al. | 106/22 H |
| 4,990,186 | 2/1991 | Jones et al. | 106/22 F |

FOREIGN PATENT DOCUMENTS

| | | |
|---|---|---|
| 0034972 | 9/1981 | European Pat. Off. . |
| 2004904 | 4/1979 | United Kingdom . |

*Primary Examiner*—Helene Klemanski
*Attorney, Agent, or Firm*—Charles D. Gunter, Jr.

[57] ABSTRACT

The present invention relates to a composition and to a method for using it, notably to an edible ink containing acetone and at least one other solvent selected from water, an alkanol and/or an alkyl ester of an alkyl carboxylic acid, and to a method for printing images with the ink compositions using an ink jet printer.

6 Claims, No Drawings

INK COMPOSITION

CROSS-REFERENCE TO RELATED APPLICATIONS

This case is a continuing application of earlier filed application Ser. No. 08/104,051, filed Aug. 13, 1993, entitled "Ink Composition", by the same inventor now abandoned.

The present invention relates to a composition and to a method for using it, notably to an edible ink containing acetone and at least one other solvent selected from water, an alkanol and/or an alkyl ester of an alkyl carboxylic acid, and to a method for printing images with the ink compositions using an ink jet printer.

BACKGROUND TO THE INVENTION

A number of forms of ink jet printer have been used to apply ink compositions to a wide range of substrates. In many cases the ink is put up in the form of a solution or suspension in an organic solvent, notably MEK. The use of MEK provides an ink which is highly suitable for use in ink jet printers, since it gives an ink which can readily be jetted, which is aggressive to many plastic substrates so that the printed image adheres firmly to the substrate, and which dries rapidly so that the printed image resists smudging or smearing allowing the printed substrate to be handled almost immediately after printing. Furthermore, MEK readily dissolves most of the dyestuffs and other components used in ink compositions, giving the printer the freedom to use a wide range of ink compositions.

Despite the many technical advantages in the use of MEK and similar solvents, major problems arise in that such solvents are often toxic or present health hazards and are becoming less and less acceptable from an environmental standpoint. Thus, MEK is flammable and presents a health hazard, notably when vapours are inhaled or fluid contacts the skin, and it would be desirable to use a solvent or carrier medium for the ink which is physiologically acceptable, notably so as to allow the ink to be applied directly to a foodstuff or to packaging closely associated with a foodstuff.

It has therefore been proposed to use lower alkanols or water as the solvent or carrier medium for the ink. Whilst such solvent or carrier media reduce or avoid the physiological problems associated with the use of MEK, ink formulations using such a solvent or carrier dry slowly and spread upon contact with non-porous surfaces, notably many of the clay filled glossy surfaced papers currently used in the packaging industry, so that the printed image smears and loses its sharp definition. Furthermore, since many of the dyestuffs or other components required for the ink compositions are often insoluble or only slightly soluble in water or alkanols, the use of such solvent or carrier media limits the range of ink formulations the printer can use.

We have now found that the use of acetone as the major constituent of the carrier medium reduces the above problems and provides an edible ink which can be applied directly to a foodstuff or to packaging in immediate contact with the foodstuff.

SUMMARY OF THE INVENTION

Accordingly, the present invention provides an edible ink composition suitable for application through the nozzle of an ink jet printer to a foodstuff or to packaging in immediate contact with the foodstuff, which ink composition comprises a physiologically acceptable image forming ingredient dissolved or dispersed in a carrier medium, characterised in that the carrier medium comprises as essential ingredients:

A. at least 50% by weight of acetone; and
B. at least one other solvent selected from water or a physiologically acceptable lower alkanol and/or a physiologically acceptable lower alkyl ester of a lower alkyl carboxylic acid in which the alkyl moieties of the alkanol and the ester contain from 1 to 3 carbon atoms and the total number of carbon atoms in both the ester and the alkanol is from 5 to 8;

and in that where water is present as the other solvent, it is present in a weight ratio of from 1:3 to 1:1 of the acetone present;

and in that where an alkanol or ester is present as the other solvent, it is present in an amount of less than 30% by weight of the total carrier medium.

The invention further provides a process for printing an image with an ink composition of the invention, characterised in that the composition is applied through the nozzle orifice of an ink jet printer to a foodstuff or to the packaging immediately in contact with the foodstuff.

Ink jet printers are non-contact printers in which individual droplets of the ink are applied at individually selected positions on a substrate so as to form the desired image. The printer can be of the drop on demand type in which discrete droplets of ink are ejected from an array of nozzles past which the substrate passes, the nozzles being activated at the desired frequency and in the desired order to form the desired image on the substrate. Thus, the printer can be one in which ink under pressure flows to the nozzles via valving means which are actuated under the control of a computer or the like to allow ink to flow to the required nozzle to eject a droplet from that nozzle. Alternatively, ink can be fed to an ink chamber provided with a piezoelectric crystal which modifies the shape of the chamber when a voltage is applied to the crystal so as to eject a droplet of ink from a nozzle outlet to the chamber. For convenience, such types of printer will be designated generally hereinafter as drop on demand ink jet printers.

Alternatively, the droplets can be applied by what is known as a continuous ink jet printer in which ink is fed under pressure from a reservoir through a nozzle to form a jet of ink. This jet is broken up into discrete substantially uniformly sized and spaced apart droplets by applying vibration or pressure pulses to the ink. This can be achieved by vibrating the nozzle or the nozzle assembly by means of a piezoelectric crystal, or by immersing a vibration probe, for example a piezoelectric crystal rod, in the ink itself. The ink is charged by applying a voltage between the ink jet before it breaks up into droplets and a charge electrode, so that each droplet carries a known charge. The charged droplets then pass through a deflection electric field where they are deflected from their straight line of flight by the deflection field applied. The extent of deflection will determine the point at which the droplets strike a substrate passing the printer and the charge and/or deflection fields are varied to direct the droplets to the desired location on the substrate. Droplets which are not to be printed are not deflected but are caught in a catcher or gutter and are returned to the ink reservoir for re-use. Such ink jet printers are generally denoted as continuous ink jet printers hereinafter.

Many forms of the above types of printer are known and commercially available and may be used without modification in the method of the invention. For convenience, the invention will be described hereinafter in terms of an ink for use in a drop on demand ink jet printer where the ink need not necessarily contain conductive or polar materials, although such materials may coincidentally be present, for example by virtue of the mixture of solvents employed as the carrier medium.

The carrier medium is preferably a mixture of acetone with water in weight proportions of from 3:1 to 1:1. However, alkanol and/or alkyl ester components may also be present in the carrier medium in a total of up to 30% by weight of the total carrier medium. The ester is an ester of a $C_1$ to $C_3$ alkanol with a $C_1$ to $C_3$ aliphatic monocarboxylic acid. Thus, the alkanol may be selected from methyl, ethyl or isopropyl alcohol; and the ester may be selected from esters of such alcohols with formic, acetic or propionic acids. We have found that where the ester, acid and alkanol groups in the alkanol or ester components of the carrier medium contain long chain moieties, the solubility of the dyestuff and any resin binder in the ink composition may be adversely affected. The alkyl moieties in the alkanol and ester therefore contain a total of from 5 to 8 carbon atoms. It is particularly preferred to use a mixture of an alkanol of the formula $HC_nH_{2n}OH$ and an ester of the formula $HC_mH_{2m}OOCC_pH_{2p+1}$, where the total of the sum of n+m+p is from 5 to 8. A particularly preferred alcohol is ethyl alcohol, which may be used in its pure or commercially available forms, for example as denatured alcohol or industrial methylated spirits. A particularly preferred ester is ethyl acetate.

Preferred carrier media for ink compositions for application through a drop on demand printer are those in which acetone and water predominate. However, where the composition is to be applied through a continuous jet printer, and the carrier composition contains an alkanol and an ester it is preferred that the alkanol to ester weight ratio be in the range 6:4 to 1:9, notably about 1:1.

The composition of the invention also contains an image forming component which is soluble or dispersed in the carrier medium. The image forming component can be of any suitable form having regard to the purpose to which the image on the substrate is to be put. Thus, the component can be one which fluoresces under ultra violet light or which can be detected by a magnetic reader. However, it is preferred that the component be one which forms a visible image on the substrate and which is soluble in the carrier medium. For convenience, the invention will be described hereinafter in terms of a dyestuff.

The dyestuff for present use may be put up as a fluid composition in an aqueous, ethanol, ester or other solvent, preferably in a solvent medium comprising acetone and water, which is then incorporated into the carrier medium for present use using any suitable mixing technique. The dyestuff may also be available in the form of a fine particulate solid or pigment, which is dissolved in the carrier medium of the invention. Many forms of suitable edible dyestuff are commercially available and may be used in their commercially available purity.

Preferably, the edible dyestuff is dissolved in the carrier medium and, for convenience, the invention will be described hereinafter in terms of the use of a solution of a water soluble dyestuff. The dyestuff in preferably used in an amount of from 0.1 to 20%, preferably from 0.1 to 6%, notably from 0.1 to 5% by weight based of the dyestuff on the ink composition.

It is preferred that the ink composition also contain one or more film forming resins to aid adhesion of the ink droplet to the substrate and to provide a measure of protection to the dried droplet against abrasion and the action of water or other solvents contacting the dried droplet. Typically, such resins will be selected from edible resins as commonly used in ink compositions, and include, for example, acrylic copolymers, rosin esters, shellac, polyvinyl esters, ketone resins, urea aldehyde resins, vinyl chloride/vinyl ether or vinyl acetate co-polymers, cellulose ethers and esters, polyamide resins, styrene/maleate resins, polyvinylpyrrolidone resins, vinyl pyrrolidone/vinyl acetate co-polymers, polystyrene resins, melamine resins, thermosetting acrylic resins, polyurethane resins and radiation curable acrylate resins. Such resins can be used in their commercially available forms. It is particularly preferred to use an edible cellulose ester or ether or shellac as the binder resin.

It is preferred that the ink compositions for present use contain from 0.05 to 40%, preferably 0.1 to 20%, by weight of the binder or film-forming component, based on the total weight of the ink composition.

The compositions of the invention have a viscosity of typically less than 20 Cps, preferably less than 10 Cps, preferably 1 to 6 Cps, at 20° C.

Where the ink composition is to be applied through a continuous ink jet printer, it will usually be necessary to incorporate one or more ionic components into the ink so that it will have sufficient conductivity to accept the charge to be induced in it. Typically, it will be desired to use an ink composition with a conductivity of from 500 to 2500, preferably 750 to 1250, microSiemens per centimeter. This can be achieved by the incorporation of one or more ionic materials into the ink, which may incidentally be present in one or more of the desired components, for example as salts in the dyestuff or the dyestuff itself. Suitable salts which may be added include ammonium, sodium or potassium salts of organic acids, such as acetic or propionic acids.

The ammoniation of a component of the ink composition may also be used to provide at least part of the conductivity required in the composition. Such an ammoniated component is often readily soluble in the carrier medium but reverts to a water insoluble form due to loss of the ammonia from the printed droplet, whereby the component provides the printed droplet with enhanced water resistant properties. It is preferred that the component to be ammoniated be a binder, notably an organic resin containing one or more carboxylic acid groups, for example shellac or a carboxylated acrylic resin.

We have found that the use of a mixture of the ester and lower alkanol in the carrier medium will often result in a conductivity equivalent to MEK and can thus be used without the need for added salts or other polar or ionic components. Preferred mixtures for this purpose contain the alkanol and ester in weight proportions of from 6:4 to 1:9.

The ink compositions for present use can be made by any suitable method, for example by mixing together solutions of the components in one or more of the solvents of the carrier medium and then diluting the mixture to the desired concentration with further solvent.

The ink compositions of the present invention are edible and can be printed directly onto a food stuff or onto packaging which is in immediate contact with the foodstuff.

I claim:

1. An edible ink composition suitable for application through the nozzle of an ink jet printer to a foodstuff or to packaging in immediate contact with the foodstuff, which ink composition comprises a physiologically acceptable image forming ingredient dissolved or dispersed in a carrier medium, wherein the carrier medium comprises as essential ingredients:

A. at least 50% by weight of acetone; and

B. at least one other solvent selected from the group consisting of water, a physiologically acceptable lower alkanol and a physiologically acceptable lower alkyl ester of a lower alkyl carboxylic acid or mixtures thereof wherein the alkyl moieties of the alkanol and the ester contain from 1 to 3 carbon atoms and the total number of carbon atoms in both the ester and the alkanol is from 5 to 8;

and in that where water is present as the other solvent, it is present in a weight ratio of from 1:3 to 1:1 of the acetone present;

and in that where an alkanol or ester is present as the other solvent, it is present in an amount of less than 30% by weight of the total carrier medium.

2. A method for applying an edible image to a foodstuff or to packaging in immediate contact with the foodstuff, wherein the edible ink as claimed in claim 1 is applied as discrete droplets of the ink to individually selected positions through the nozzle orifice of an ink jet printer so as to form the desired image to the foodstuff or packaging.

3. The ink composition as claimed in claim 1 wherein the ink composition contains from 0.1 to 5% by weight of an edible dyestuff, and from 0.1 to 20% by weight of an edible cellulose ether or ester or shellac as a binder or film-forming agent to aid adhesion of the ink to the foodstuff or packaging.

4. The ink composition as claimed in claim 1 wherein the ink has a conductivity of from 750 to 1250 microSiemens per centimeter.

5. The ink composition as claimed in claim 1 wherein the image forming ingredient is a water soluble food grade dyestuff.

6. The ink composition as claimed in claim 1 further comprising a physiologically acceptable film forming resin.

* * * * *